United States Patent Office.

CHARLES L. ROBERTSON, OF PROVIDENCE, RHODE ISLAND, ASSIGNOR TO AMERICAN ENAMEL COMPANY, OF SAME PLACE.

Letters Patent No. 67,679, dated August 13. 1867.

IMPROVED MANUFACTURES OF ENAMELLED WOOD.

The Schedule referred to in these Letters Patent and making part of the same.

TO ALL WHOM IT MAY CONCERN:

Be it known that I, CHARLES L. ROBERTSON, of the city and county of Providence, in the State of Rhode Island, have invented or produced a New Manufacture; and I do hereby declare that the following specification is a full, clear, and exact description thereof.

The new manufacture which I claim to have produced is exhibited in any article made from wood, of whatever form taste or utility may dictate, and coated with a peculiar enamel, the effect of which is to give to such article properties and qualities which it did not possess before.

The composition of the enamel which I employ, and the proper method of preparing and applying it to articles, is fully described in the Letters Patent of the United States, granted to me on the second day of April, A. D. 1867, and to which reference may be made with the same effect as if the description in such Letters Patent were here repeated. The effect upon any article of wood to which the enamel has been applied is to render it impervious to moisture, and to give it a surface which is able to resist the action of boiling water, acids, and all variations of temperature without the slightest injury. In cases where wood, from its disposition to warp and crack from atmospheric or other sources or influences, would render it unfit for use, this material will, after being enamelled as described in the Letters Patent referred to, be rendered as useful and as serviceable as vulcanized hard rubber, from which in appearance it can with difficulty be distinguished. By this means cheap woods, as, for instance, poplar or pine, can be made use of for purposes for which, in their natural state, they are totally unfit, as for example, handles for table cutlery, napkin-rings, pendants and hoops for ear-rings, plain and ornamental buttons, articles for the toilet-table, and a multitude of other useful and ornamental purposes, may be made of these and similar woods at a trifling expense compared with the cost of like articles made from ebony or from hard rubber, and will be of equal beauty and durability.

What I claim as my invention, and desire to secure by Letters Patent as a new manufacture, is—

Articles of use or ornament made of wood and enamelled by means of the composition substantially as described in the Letters Patent granted to me April 2, 1867.

C. L. ROBERTSON.

Witnesses:
BENJ. F. THURSTON,
C. LEONARD PENDLETON.